(12) United States Patent
Menet et al.

(10) Patent No.: US 12,404,952 B2
(45) Date of Patent: Sep. 2, 2025

(54) CLAMPING PIPELINES

(71) Applicant: ACERGY FRANCE SAS, Suresnes (FR)

(72) Inventors: Florent Menet, Leer (DE); Hugo Martin, Croissy-sur-seine (FR)

(73) Assignee: ACERGY FRANCE SAS, Suresnes (FR)

( * ) Notice: Subject to any disclaimer, the term of this patent is extended or adjusted under 35 U.S.C. 154(b) by 318 days.

(21) Appl. No.: 18/019,819

(22) PCT Filed: Aug. 4, 2021

(86) PCT No.: PCT/IB2021/000532
§ 371 (c)(1),
(2) Date: Oct. 6, 2023

(87) PCT Pub. No.: WO2022/029493
PCT Pub. Date: Feb. 10, 2022

(65) Prior Publication Data
US 2023/0287995 A1 Sep. 14, 2023

(30) Foreign Application Priority Data
Aug. 6, 2020 (GB) ........................ 2012272

(51) Int. Cl.
*F16L 1/20* (2006.01)
*F16L 3/10* (2006.01)

(52) U.S. Cl.
CPC ............... *F16L 1/20* (2013.01); *F16L 3/1066* (2013.01)

(58) Field of Classification Search
CPC ..... F16L 1/16; F16L 1/161; F16L 1/20; F16L 1/24; F16L 3/1066
(Continued)

(56) References Cited

U.S. PATENT DOCUMENTS

| | | | | |
|---|---|---|---|---|
| 4,253,779 | A | * | 3/1981 | Grognu ..................... F16L 1/26 405/188 |
| 4,315,702 | A | * | 2/1982 | Moe .......................... F16L 1/26 405/169 |

(Continued)

FOREIGN PATENT DOCUMENTS

| | | | | |
|---|---|---|---|---|
| CN | 108397597 | A | * 8/2018 | ................ F16L 1/20 |
| CN | 113464723 | A | * 10/2021 | |

(Continued)

*Primary Examiner* — Frederick L Lagman
(74) *Attorney, Agent, or Firm* — MATTINGLY & MALUR, PC

(57) ABSTRACT

A method of fixing a clamp around a pipe comprises supporting the pipe between curved clamp parts, namely a cradle and shells, that are assembled in mutual opposition about the pipe while fabricating the clamp. By placing the pipe into the cradle and then bringing the shells into contact with the pipe, those opposed clamp parts are simultaneously in contact with the pipe. Initially, a gap is maintained at an interface between the clamp parts. A full penetration weld is then formed in the gap. As the weld cools and shrinks, the clamp parts are drawn together, to a mutual spacing narrower than the original gap, to compress the pipe between them. The clamp is suitable for attaching the pipe to a structure such as the frame of a subsea pipeline accessory, for example a valve in fluid communication with the pipe.

21 Claims, 4 Drawing Sheets

(58) Field of Classification Search
USPC .............................................. 405/169, 184.4
See application file for complete search history.

(56) References Cited

U.S. PATENT DOCUMENTS

| | | | | |
|---|---|---|---|---|
| 4,459,065 A | * | 7/1984 | Morton | F16L 1/26 166/347 |
| 5,458,439 A | * | 10/1995 | Hall | F16L 1/26 405/188 |
| 7,942,608 B2 | | 5/2011 | Bastard et al. | |
| 8,882,392 B1 | | 11/2014 | Cruz et al. | |
| 10,371,288 B1 | | 8/2019 | Crisinelis | |

FOREIGN PATENT DOCUMENTS

| | | |
|---|---|---|
| EP | 2 250 415 | 8/2009 |
| EP | 2 510 270 | 10/2012 |
| GB | 1 305 516 | 2/1973 |
| JP | 2002 243068 | 8/2022 |

\* cited by examiner

CLAMPING PIPELINES

This invention relates to clamps for fixing pipelines to structures, for example anchor clamps for securing a subsea pipeline to an accessory structure. Conversely, the invention also relates to clamps for fixing items to pipelines, such as hold-back anchor fittings. In each case, there is a need to ensure that a pipeline cannot slip relative to a supporting structure or that a smaller item cannot slip relative to a supporting pipeline.

In this specification, the invention will be described in the context of subsea pipelines or flowlines that lie on the seabed to convey hydrocarbons and other fluids from, or to, a subsea wellhead. References to pipelines herein are intended to incorporate risers that extend from the seabed to the surface to convey hydrocarbons and other fluids to, or from, a surface installation.

Clamps are often fitted around pipelines in order to attach the pipeline to a structure or to attach an item to the pipeline. In each case, the clamp has to be fixed immovably to the pipeline.

One example of a clamp is an anchor clamp that is mounted on a subsea structure connected to a subsea pipeline. Such a structure may, for example, be the foundation or frame of a pipeline accessory. The anchor clamp transfers mechanical loads between the pipeline and the structure. In particular, axial loads and bending moments in the pipeline are transferred to the structure during installation and operation.

In this respect, subsea pipelines are routinely fitted with accessories during installation to provide operational flexibility, to create desired field layouts and to support future field extensions. Such accessories may be disposed at the ends of a pipeline and at in-line positions along its length. They include in-line tee assemblies (ILTs or ITAs), pipeline end manifolds (PLEMs), pipeline end terminations (PLETs, sometimes called flowline end terminations or FLETs), tie-in branches, valves, connectors, wyes, tees, shutdown valves, pigging connections, pig-launching equipment and pig-receiving equipment.

Structures in line with the pipeline may therefore surround or support sensitive components such as tees or valves that have to be isolated from loads applied through the pipeline. For example, an anchor flange may be welded to or incorporated into the pipeline to transfer loads from the pipeline to a frame or foundation that supports such components. Alternatively, a bolted clamp around the pipeline may be fixed to the frame or foundation that supports such components.

Another example of a clamp is a hold-back clamp, which may be attached to a subsea pipeline to restrain movement or 'walking' of the pipeline across the seabed driven by sea dynamics or by cycles of thermal elongation and contraction. Uncontrolled displacement of a subsea pipeline can cause the pipeline to buckle, can displace or damage structures connected to the pipeline and can make connections to other subsea infrastructure problematic. Thus, pipeline motion may be restrained by anchoring the pipeline as exemplified in U.S. Pat. No. 8,882,392, in which anchor chains connect hold-back clamps to anchors embedded in the seabed.

A conventional pipeline clamp comprises two half-tubular portions or shells that are bolted together in mutual opposition around the pipeline to define a bore that receives the pipeline. The shells clamp together to engage an outer surface or coating of the pipeline so as to prevent relative movement between the clamp and the pipeline.

In clamps that rely upon friction to hold the pipeline, resistance to movement is proportional to the area of contact between the inner surfaces of the shells and the outer surface of the pipeline. Thus, to ensure sufficient grip on the pipeline, friction clamps tend to be lengthy so as to maximise the area of contact. This increases their bulk and their cost. Also, the length and rigidity of a clamp may generate stress in the pipeline by restricting the freedom of the pipeline to bend along its length during installation and in use.

Bolted clamps can be difficult to put in place and may present some risk for the pipeline, especially when located deep underwater. For example, due to issues such as creep, bolted connections between shells may not be able to maintain clamping force consistently throughout the long design life of a subsea pipeline. In principle, bolted friction clamps could be oversized to compensate for such deterioration but increasing the size of the clamp would worsen the related disadvantages noted above.

Another conventional fastening method for a clamp employs a stopper or collar plate as described in EP 2250415. Alternatively, EP 2510270 teaches grouting a clamp onto a pipeline, typically by injecting epoxy grout. Both solutions add cost and complexity.

It is also possible to incorporate a fixing structure into a pipeline, which involves interposing a forged piece between, and welding the piece to, successive lengths of pipe. However, a forged piece is costly to produce. Also, producing, testing and coating the critical welds between the forged piece and the adjoining pipes takes a long time and requires a specific welders' qualification. These factors also add cost and complexity.

Against this background, the invention resides in a method of fixing a clamp around a pipe. The method comprises: supporting the pipe between clamp parts that are disposed in mutual opposition about the pipe, the pipe being supported in a cradle of part-circular cross-section, the cradle being one of the clamp parts; engaging the pipe, when supported in the cradle, with at least one shell of part-circular cross-section, the or each shell being another of the clamp parts; maintaining a gap within at least one interface between the clamp parts; forming a weld in the or each gap, the or each weld being formed between a support of a shell and an outrigger of the cradle at a location offset laterally from a longitudinal axis of the pipe; and cooling and shrinking the or each weld to draw together, and to compress the pipe between, the clamp parts.

The opposed clamp parts may be in contact with the pipe before and during formation of the or each weld, which may preferably be a full penetration weld. The clamp may conveniently be fabricated by assembling the clamp parts around the pipe and then forming the or each weld.

The or each weld may, for example, be formed in a direction toward or away from the longitudinal axis of the pipe.

Where there are two or more welds, those welds may advantageously be formed on opposed sides of a longitudinal plane that bisects the pipe, for example at locations that are laterally outboard of the longitudinal plane. Such welds may be in mutual alignment along a common axis, which axis may include a chord of a circular cross-section of the pipe.

Various weld sequences are possible. For example, two or more welds may be formed simultaneously, sequentially, in a common direction or in mutually-opposed directions, or intermittently in alternation.

The inventive concept also embraces a corresponding pipe-clamping arrangement that comprises: a pipe supported between clamp parts that are disposed in mutual opposition about the pipe, the pipe being supported in a cradle of part-circular cross-section, the cradle being one of the clamp parts; at least one shell of part-circular cross-section, the or each shell being another of the clamp parts; and at least one interface between the clamp parts. The pipe is held in compression between the clamp parts by virtue of shrinkage of at least one weld, for example a full penetration weld, that joins the clamp parts at the or each interface. The, or each, weld is formed at an interface between a support of the, or each, shell and an outrigger of the cradle at a location offset laterally from a longitudinal axis of the pipe.

The pipe-clamping arrangement of the invention may further comprise a structure to which the pipe is attached by the clamp parts. Such a structure may suitably comprise, support or protect an accessory in fluid communication with the pipe.

In summary, the invention pre-stresses shells around the pipeline by virtue of shrinkage due to welding. This exerts a strong mechanical clamping effort on the pipeline without, disadvantageously, welding directly to the pipeline or relying on bolted connections.

GB 1305516 discloses fitting a two-part sleeve around the joint of a lined pipe and forming a circumferential weld between the annular parts of the sleeve to effect compressive sealing of the joint. In particular, the sleeve compresses the joint axially and so ensures fluid tightness as the weld between the parts of the sleeve cools and shrinks.

In contrast to the simplicity of the invention, the technique described in GB 1305516 is fundamentally as challenging as welding a forged piece into the pipeline as acknowledged above. Also, unlike the invention, GB 1305516 uses weld shrinkage to draw together adjoining lengths of the pipeline in an axial or longitudinal direction during its fabrication. Such movement is of no use to clamp a prefabricated pipeline, which the invention achieves by using a radially-inward component of movement driven by weld shrinkage to force an external clamp element against the exterior of the pipeline.

Embodiments of the invention implement a method to grip a clamp around a tubular element on a support. The method comprises: manufacturing clamp shells designed to leave a shrinkage gap; providing a tubular element such as a horizontal pipe on the support; welding the clamp shells on the support so that the clamp shells are in contact with the tubular element and the weld has a gap that allows weld shrinkage; and cooling down the weld so that it shrinks and the clamp shells compress the tubular element.

One or more of the clamp shells may comprise a partial cylinder or tube to embrace an arc of the pipe. The support may comprise a cradle to receive the pipe and at least one lateral support for welding the clamp.

In summary, the invention provides a technique for fixing a clamp securely around a pipe. That technique involves supporting the pipe between oppositely-curved clamp parts such as a cradle and shells. The clamp parts are assembled in mutual opposition about the pipe while fabricating the clamp. By, for example, placing the pipe into the cradle and then bringing the shells into contact with the pipe, those opposed clamp parts are simultaneously in contact with the pipe.

Initially, with all of the clamp parts kept in contact with the pipe, a gap is maintained at an interface between the clamp parts before a weld is formed in the gap. As the weld cools and shrinks, the clamp parts are drawn together, to a mutual spacing narrower than the original gap, to compress the pipe between them.

The clamp is suitable for attaching the pipe to a structure such as the frame of a subsea pipeline accessory, for example a valve in fluid communication with the pipe.

In order that the invention may be more readily understood, reference will now be made, by way of example, to the accompanying drawings in which.

Figure 3:
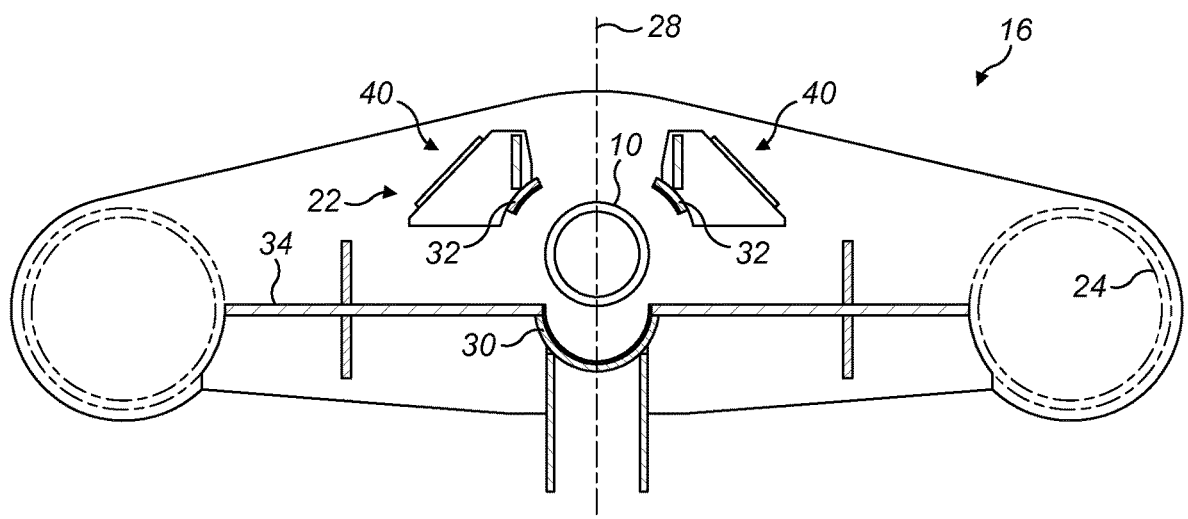
FIG. 3 is an exploded cross-sectional view through the clamp and pipeline shown in FIGS. 1 and 2.
Figure 4:
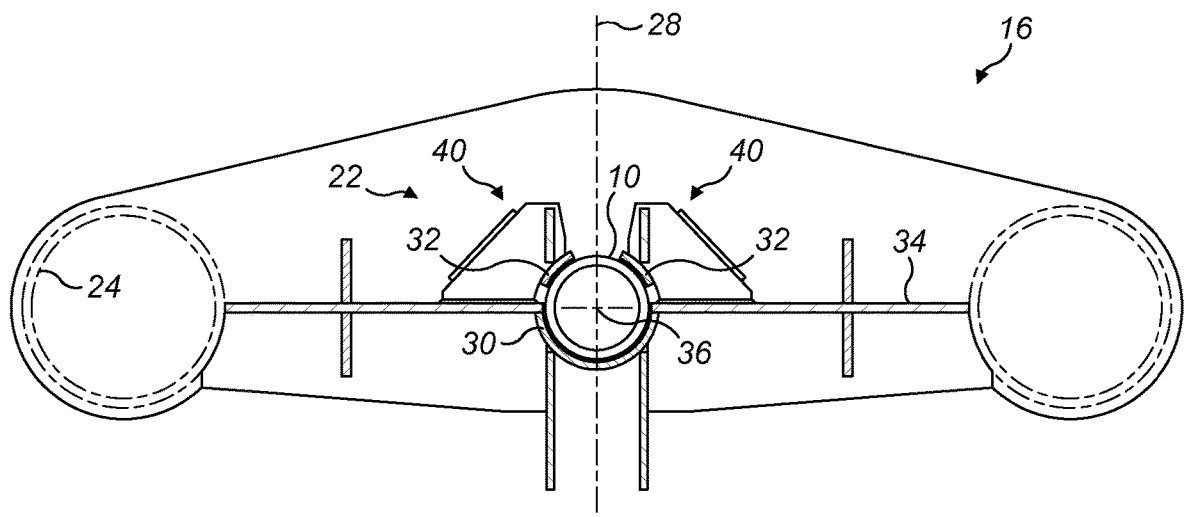
Figure 5:
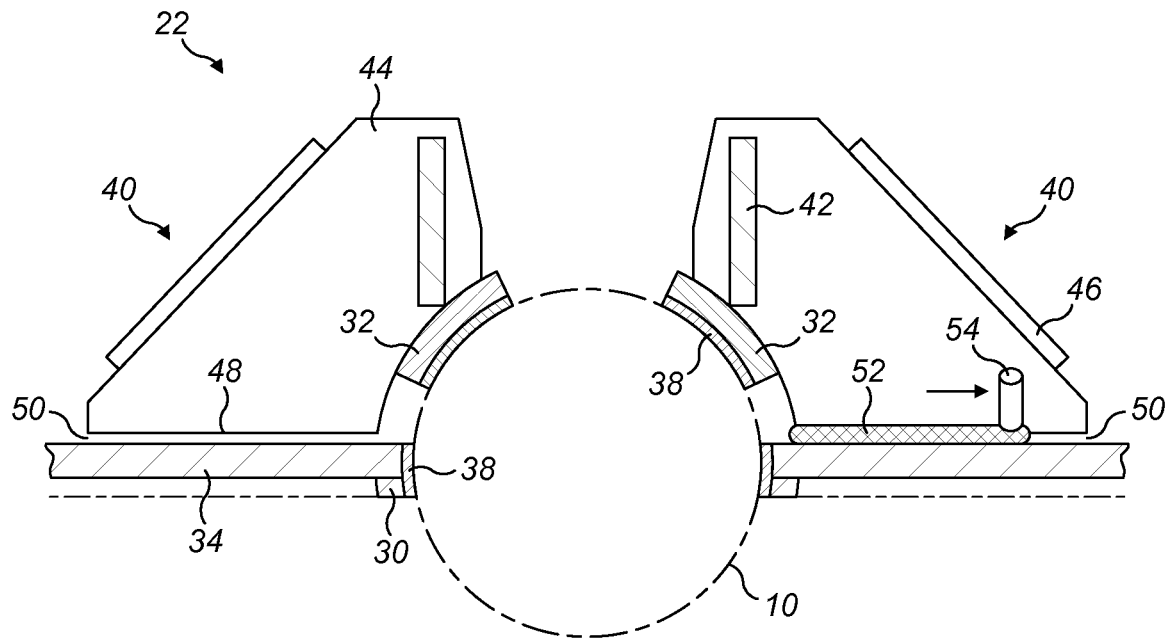
Figure 6:
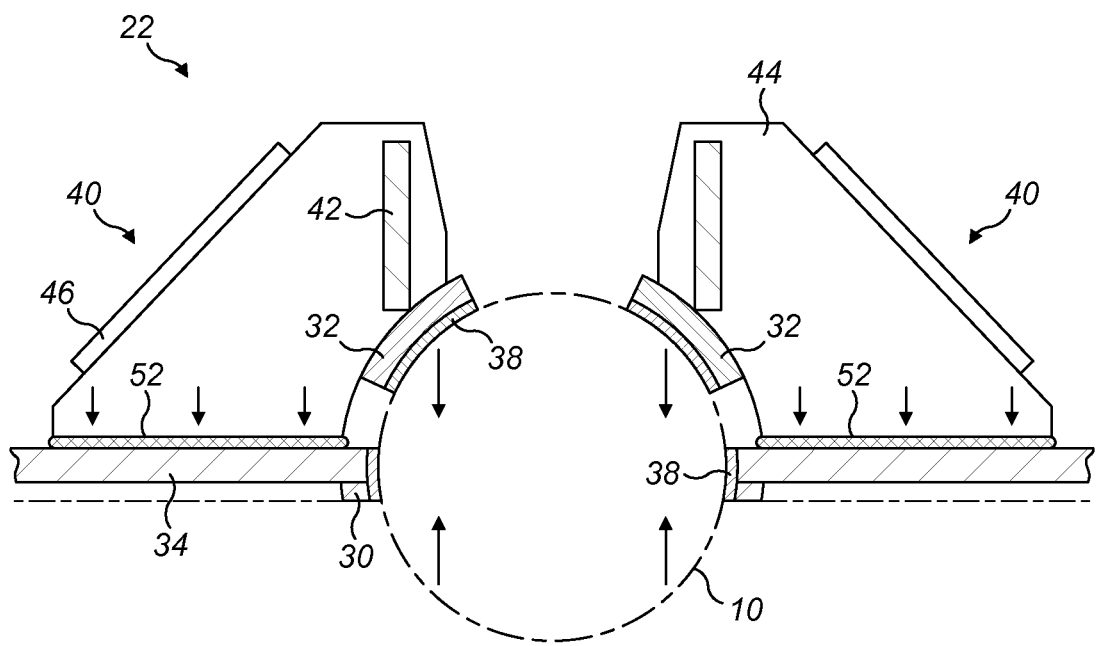

FIG. 4 corresponds to FIG. 3 but shows the clamp assembled around the pipeline;

FIG. 5 is an enlarged view of the clamp while its parts are being welded together around the pipeline; and FIG. 6 corresponds to FIG. 5 but shows the clamp now fully welded and applying compressive force inwardly against the exterior of the pipeline by virtue of cooling and shrinkage of the welds.

Figure 1:
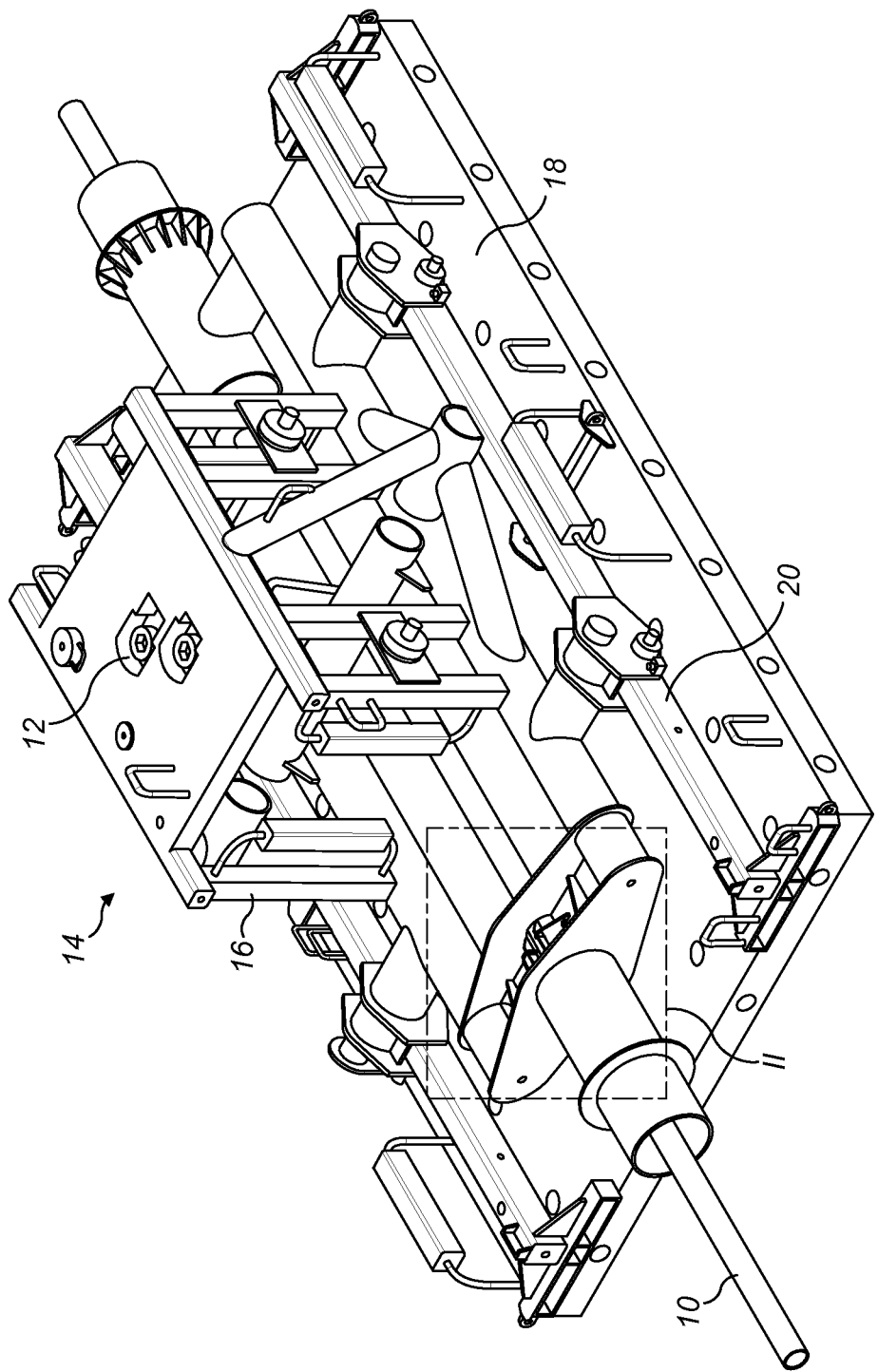
FIG. 1 is a perspective view of a subsea pipeline incorporating an in-line accessory, the accessory being supported by a structure comprising a mudmat foundation to which the pipeline is attached by a clamp of the invention.

Referring firstly to FIG. 1 of the drawings, a subsea pipeline 10 incorporates an in-line accessory 12, such as an in-line tee or valve, in fluid communication with the pipeline 10. The accessory 12 is supported by a structure 14 that includes a frame 16 disposed around the accessory 12 and a foundation, exemplified here by a mudmat 18, for providing an interface with the seabed soil. Once landed on a soft seabed of sand or silt, the weight of the accessory 12 and the frame 16 is spread and supported by the mudmat 18, which keeps the accessory 12 and the pipeline 10 stable.

As the pipeline 10 will undergo cycles of thermal elongation and contraction due to temperature fluctuations between operation and shut-down, the pipeline 10 and the accessory 12 are susceptible to move parallel to the seabed. To avoid buckling of the pipeline 10 under compressive stress as a result, the accessory 12 and the frame 16 are decoupled from the mudmat 18 in this example. Specifically, the accessory 12 and the frame 16 can move longitudinally relative to the mudmat 18 on parallel longitudinally-extending rails 20. In this way, the accessory 12 can move horizontally relative to the seabed, in a direction parallel to the principal axis of the pipeline 10, while the mudmat 18 remains stationary on the seabed.

The frame 16 supports an anchor clamp 22 that is arranged to clamp around the pipeline 10 at a position offset longitudinally along the pipeline 10 from the accessory 12. The anchor clamp 22 thereby transfers loads from the pipeline 10 to the frame 16 along a load path that bypasses the accessory 12 and that extends from the frame 16 to the seabed via the mudmat 18.

Figure 2:
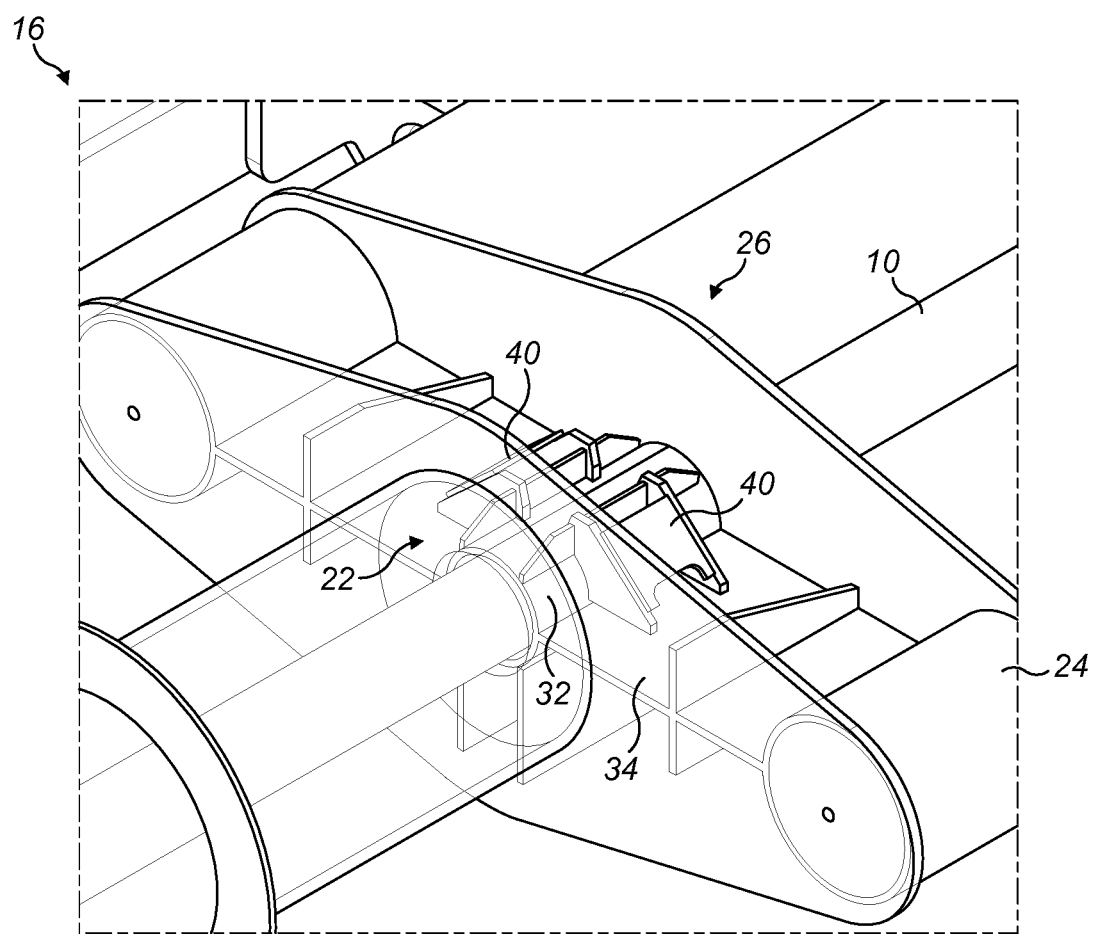
FIG. 2 is an enlarged detail view corresponding to Detail II of FIG. 1.

Referring now also to FIGS. 2, 3 and 4, the frame 16 comprises a parallel pair of longitudinally-extending tubes 24 that extend orthogonally to, and are joined by, a transverse bridge structure 26. The anchor clamp 22, the tubes 24 and the bridge structure 26 are each symmetrical about a central longitudinal plane 28. The bridge structure 26 supports the anchor clamp 22 on the central plane 28.

The anchor clamp 22 comprises an upwardly-concave, longitudinally-extending, part-tubular trough or cradle 30 of half-circular cross section that is bisected by the central plane 28. The anchor clamp 22 further comprises a pair of downwardly-concave, longitudinally-extending, part-tubular shells 32 that are opposed to the cradle 30 and are mutually spaced one each side of the central plane 28. Thus, the cradle 30 and the shells 32 are clamp parts that are angularly spaced from each other around the pipeline 10 and together clamp the pipeline 10 between them when assembled as shown in FIG. 4.

Specifically, the cradle 30 is disposed at the centre of a horizontal plate 34 of the bridge structure 22 and divides the plate 34 into two halves in mirror relation. The halves of the plate 34 are therefore outriggers with respect to the cradle 30. The plate 34 extends in a plane parallel to, or containing, the central longitudinal axis 36 of the pipeline 10 when the anchor clamp 22 is assembled around the pipeline as shown in FIG. 4.

The cradle 30 may conveniently be formed by cutting along a pipe that is then welded to the halves of the plate 34 to join those halves together. The shells 32 may also conveniently be formed by cutting along a pipe, most efficiently the same pipe as is cut to make the cradle 30. Thus, the cradle 30 and the shells 32 have a common radius of curvature, being slightly greater than or equal to the outer radius of the pipeline 10.

In this example, the cradle 30 and the shells 32 are each lined on their concave inner surfaces with a resilient, elastomeric liner 38 of, for example, neoprene rubber, as best appreciated in the enlarged views of FIGS. 5 and 6. The liner 38 conforms to the outer contour of the pipeline 10 when compressed and so improves grip of the anchor clamp 22 on the pipeline 10.

The shells 32 are supported by, and cantilevered toward each other from, respective supports 40 that are welded to respective halves of the plate 34. Thus, the plate 34 serves as a platform for the supports 40 to hold the shells 32 in engagement with the pipeline 10.

FIGS. 5 and 6 best show that each support 40 comprises an upright longitudinal batten 42 extending along a respective shell 32. The shell 32 and the batten 42 are both held by a pair of parallel braces 44 that are joined to each other by a stiffening panel 46. The braces 44 lie in longitudinally-spaced parallel planes that extend orthogonally relative to the central longitudinal axis 36 of the pipeline 10 and the plane of the plate 34. Conversely, the panel 46 lies in a plane parallel to that axis 36 and at an acute angle to the plane of the plate 34.

The braces 44 of the supports 40 each have a flat underside 48 that is arranged to lie on top of the plate 34, in parallel relation, so as to facilitate welding along their mutual interface. In this respect, specific reference is made to FIGS. 5 and 6.

FIG. 5 shows the pipeline 10 received in the cradle 30 and the shells 32 lying upon, and bearing against, the pipeline 10 in opposition to the cradle 30 about the central longitudinal axis 36. At this stage, the braces 44 of the supports 40 are held spaced from the plate 34, for example by being set up on a supporting jig, not shown, that may be fixed to the frame 16. This leaves a gap 50 between the undersides 48 of the braces 44 and the plate 34, which gap 50 facilitates the formation of full-penetration butt welds 52 between the braces 44 and the plate 34. Typically, the welds 52 are formed by manual arc welding although automatic welding or other welding techniques would be possible instead.

The welds 52 are in mutual opposition about the central longitudinal plane 28. In this example, the welds 52 are straight and are in mutual alignment along a common axis that forms a chord of the circular cross-section of the pipeline 10.

One of the welds 52 is shown schematically in FIG. 5 being formed by a torch or electrode 54 during a welding pass, hence filling the gap 50 in the process to fuse the supports 40 onto the plate 34.

In the example shown in FIG. 5, the weld 52 is being formed as the torch or electrode 54 moves in a direction away from the central plane 28 but it would be possible instead to form the weld 52 in the opposite direction, as the torch or electrode 54 moves toward the central plane 28. This example also shows one of the supports 40 being welded to the plate 34 before welding the other support 40 to the plate 34.

Other welding sequences are possible. For example, it would be possible instead to weld both of the supports 40 to the plate 34 simultaneously using two or more torches or electrodes 54 at once. In that case, welding could be effected by moving torches or electrodes 54 in the same direction for both supports 40 or in mutually-opposed directions with respect to the central plane 28, or intermittently in alternation between the supports 40. Also, each weld 52 may be formed by performing passes of one or more torches or electrodes 54 on one or both sides of each brace 44, simultaneously or in succession.

FIG. 6 shows the welds 52 of both supports 40 now completed and cooled. As enabled by the gaps 50, the welds 52 have shrunk and narrowed while cooling, thus pulling the supports 40 toward the plate 34 and hence pressing the shells 32 onto the pipeline 10 as shown. The pressure applied by the shells 32 pushes the pipeline 10 into the opposed cradle 30, which exerts a reaction force against the pipeline 10 accordingly. The compression applied to the pipeline 10 by the cradle 30 and the shells 32 induces a reaction of hoop stress in the wall of the pipeline 10.

It will be apparent that the resilient liners 38 within the cradle 30 and the shells 32 are compressed and hence thinner in FIG. 6 relative to their greater thickness in the relatively relaxed state shown in FIG. 5.

By virtue of shrinkage of the welds 52, the increased inward pressure applied by the cradle 30 and the shells 32 against the pipeline 10 increases the frictional grip of the anchor clamp 22 on the pipeline 10. Elegantly, this effect is achieved by virtue of the fabrication process and without requiring the anchor clamp 22 to be enlarged, or for any parts to be bolted together, or for any welding to be performed on the pipeline 10 itself. The result is a simple, quick, consistent and effective solution to the problem of fixing pipelines to structures or, conversely, of fixing items to pipelines.

Natural cooling of the welds 52 may be preferred to forced cooling, for example by air blowing, water spraying or quenching. This is because forced cooling could introduce defects or unbalance the contact pressure on the pipeline 10 if cooling is not consistent between the welds 52 or along the length of the welds 52.

Many other variations are possible within the inventive concept. For example, some mudmat foundations are designed to slide with an accessory relative to the seabed, and so need not provide for the accessory to move relative to the mudmat. Foundations other than mudmats, such as piles embedded in the seabed, are also possible. An anchor clamp of the invention may be provided on structures other than foundations, and on smaller items that are to be fixed to pipelines.

There could be one shell, for example extending laterally to both sides of the central longitudinal plane, or more than two shells.

The invention claimed is:

1. A method of fixing a clamp around a pipe, the method comprising:
   supporting the pipe between clamp parts that are disposed in mutual opposition about the pipe, in a cradle of part-circular cross-section, the cradle being one of the clamp parts;
   engaging the pipe, when supported in the cradle, with at least one shell of part-circular cross-section, the or each shell being another of the clamp parts;
   maintaining a gap within at least one interface between the clamp parts;
   forming a weld in the or each gap, the or each weld being formed between a support of a shell and an outrigger of the cradle at a location offset laterally from a longitudinal axis of the pipe; and
   cooling and shrinking the or each weld to draw together, and to compress the pipe between, the clamp parts.

2. The method of claim 1, comprising contacting the pipe with the opposed clamp parts before and during formation of the or each weld.

3. The method of claim 1, wherein the or each weld is a full penetration weld.

4. The method of claim 1, comprising fabricating the clamp by assembling the clamp parts around the pipe and then forming the or each weld.

5. The method of claim 1, comprising forming the or each weld in a direction toward or away from the longitudinal axis of the pipe.

6. The method of claim 1, comprising forming welds on opposed sides of a longitudinal plane that bisects the pipe.

7. The method of claim 6, comprising forming the welds at locations that are laterally outboard of the longitudinal plane.

8. The method of claim 6, wherein the welds are in mutual alignment along a common axis.

9. The method of claim 8, wherein the common axis includes a chord of a circular cross-section of the pipe.

10. The method of claim 6, comprising forming the welds simultaneously.

11. The method of claim 6, comprising forming the welds intermittently in alternation.

12. The method of claim 6, comprising forming the welds in a common direction.

13. The method of claim 6, comprising forming the welds in mutually-opposed directions.

14. A pipe-clamping arrangement, comprising:
   a pipe supported between clamp parts that are disposed in mutual opposition about the pipe, wherein the pipe is supported in a cradle of part-circular cross-section, the cradle being one of the clamp parts;
   at least one shell of part-circular cross-section, the or each shell being another of the clamp parts; and
   at least one interface between the clamp parts;
   wherein the pipe is in compression between the clamp parts by virtue of shrinkage of at least one weld that joins the clamp parts at the or each interface, and wherein the or each weld is formed at an interface between a support of a shell and an outrigger of the cradle at a location offset laterally from a longitudinal axis of the pipe.

15. The arrangement of claim 14, wherein the or each weld is a full penetration weld.

16. The arrangement of claim 14, comprising welds on opposed sides of a longitudinal plane that bisects the pipe.

17. The arrangement of claim 16, wherein the welds are at locations that are laterally outboard of the longitudinal plane.

18. The arrangement of claim 16, wherein the welds are in mutual alignment along a common axis.

19. The arrangement of claim 18, wherein the common axis includes a chord of a circular cross-section of the pipe.

20. The arrangement of claim 14, further comprising a structure to which the pipe is attached by the clamp parts.

21. The arrangement of claim 20, wherein the structure comprises an accessory in fluid communication with the pipe.

* * * * *